United States Patent Office.

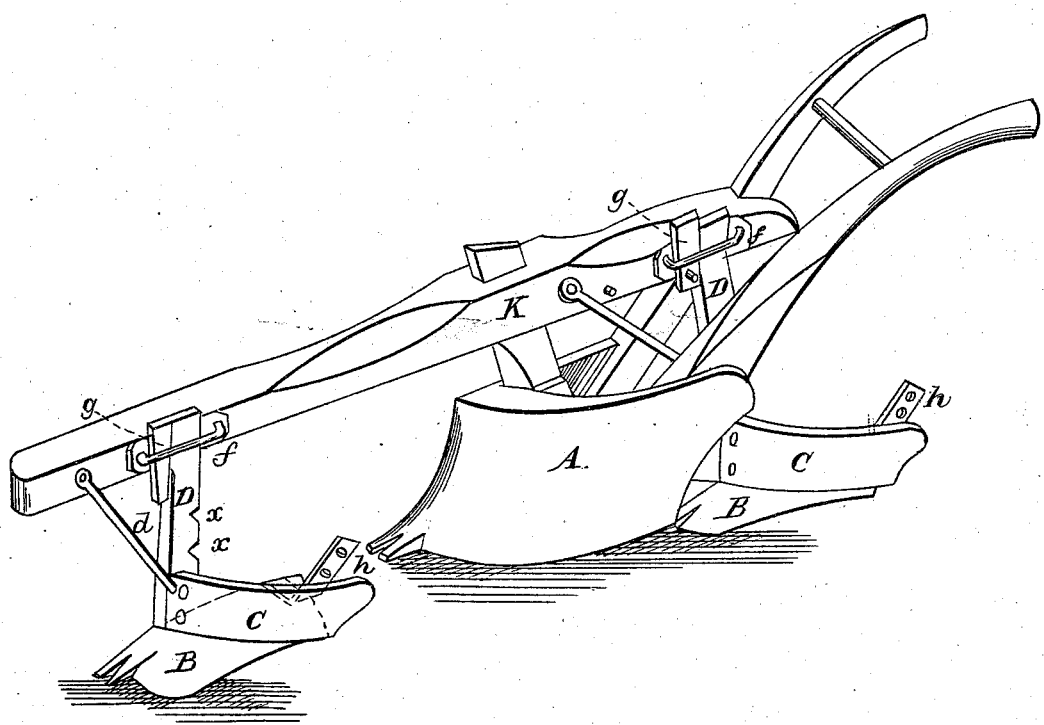

JOHN FISHER, OF MIDDLETOWN, PENNSYLVANIA.

Letters Patent No. 80,715, dated August 4, 1868.

IMPROVEMENT IN PLOWS.

*The Schedule referred to in these Letters Patent and making part of the same.*

TO ALL WHOM IT MAY CONCERN:

Be it known that I, JOHN FISHER, of Middletown, in the county of Dauphin, and in the State of Pennsylvania, have invented certain new and useful Improvements in Plows; and do hereby declare that the following is a full, clear, and exact description thereof, reference being had to the accompanying drawings, and the letters of reference marked thereon.

In the annexed drawings, making a part of this specification, K represents the beam, and A the mould-board of an ordinary plow. Attached to the beam K, either in front or behind the plow A, is a smaller plow, B, which works as a subsoil-plow.

The small or subsoil-plow B is secured to a suitable post or stud, D, which is secured at the top in a loop or slot, $f$, by means of a key, $g$. The post D is provided with notches $x$ $x$ on its back or rear side, for the purpose of affording a convenient catch for the brace $d$. It will be seen that the post D and the plow B are adjustable vertically by means of the brace hooking in either of the series of notches $x$ and the key $g$.

C represents an adjustable wing, secured, by means of bolts or screws, to the post D and lateral brace $h$, at any desired distance above the plow B.

The wing C is made adjustable so that the operator may regulate the amount or quantity of the subsoil turned or brought up to the surface. It is often desirable to loosen the earth to considerable depth, without bringing all the subsoil so loosened to the surface.

By the above-described device, the soil may be loosened, or the plow B run as deep as desired, and the amount of subsoil elevated or raised to the surface regulated without difficulty, by means of the adjustable wing C.

Having thus fully described my invention, what I claim as new, and desire to secure by Letters Patent, is—

The adjustable wing C, when used in combination with a subsoil-plow, B, and constructed and arranged as and for the purpose herein fully set forth.

In testimony that I claim the foregoing, I have hereunto set my hand, this 7th day of February, 1868.

JOHN FISHER.

Witnesses:
   A. N. MARR,
   A. A. YEATMAN.